US007235901B2

(12) United States Patent
Bares et al.

(10) Patent No.: US 7,235,901 B2
(45) Date of Patent: Jun. 26, 2007

(54) SENSOR AND INTERLOCK ON AN INDUSTRIAL VEHICLE

(75) Inventors: Mark F. Bares, Oakes, ND (US); Scott B. Jacobson, Kindred, ND (US); Jason L. Magnuson, Dilworth, MN (US); William A. Wright, Gwinner, ND (US)

(73) Assignee: Clark Equipment Company, Montvale, NJ (US)

(*) Notice: Subject to any disclaimer, the term of this patent is extended or adjusted under 35 U.S.C. 154(b) by 486 days.

(21) Appl. No.: 10/617,518

(22) Filed: Jul. 11, 2003

(65) Prior Publication Data

US 2005/0035669 A1 Feb. 17, 2005

(51) Int. Cl.
*H02H 11/00* (2006.01)
*F16P 3/00* (2006.01)

(52) U.S. Cl. ...................................... 307/326; 307/328

(58) Field of Classification Search ................ 307/326, 307/328

See application file for complete search history.

(56) References Cited

U.S. PATENT DOCUMENTS

| | | | | |
|---|---|---|---|---|
| 3,993,157 | A | 11/1976 | Schulte | 180/111 |
| 4,655,634 | A | 4/1987 | Loy et al. | 404/84 |
| 4,949,805 | A | 8/1990 | Mather et al. | 180/333 |
| 4,984,385 | A | 1/1991 | DeLand | 49/280 |
| 5,425,431 | A | 6/1995 | Brandt et al. | 180/273 |
| 5,602,526 | A * | 2/1997 | Read | 340/457 |
| 5,664,637 | A | 9/1997 | Ohta et al. | 180/286 |
| 5,892,443 | A | 4/1999 | Friedrich | 340/540 |
| 6,062,331 | A | 5/2000 | Grunow et al. | 180/268 |
| 6,135,230 | A | 10/2000 | Schenck et al. | 180/273 |
| 6,299,207 | B1 | 10/2001 | Bares | 280/748 |
| 6,805,393 | B1 * | 10/2004 | Stevenson et al. | 296/50 |
| 2002/0112688 | A1 * | 8/2002 | Fariz et al. | 123/179.2 |
| 2003/0107222 | A1 * | 6/2003 | Paskonis | 292/340 |
| 2004/0000799 | A1 * | 1/2004 | Wherley | 296/146.1 |
| 2004/0203381 | A1 * | 10/2004 | Cahn et al. | 455/41.2 |

* cited by examiner

*Primary Examiner*—Chau N. Nguyen
*Assistant Examiner*—Dru Parries
(74) *Attorney, Agent, or Firm*—Michael Best & Friedrich LLP

(57) ABSTRACT

A skid steer loader has an interlock system that is responsive to sensor input to lock out such as operation of lift and tilt cylinders of the skid steer loader when the input indicates a condition has not been met. The loader is provided with a cab that has an operator entrance and egress door, and a door latch and a latch striker on the cab are provided with a sensor that senses when the cab door is closed and latched. The lockout prevents carrying out the functions when the door is not closed and latched.

9 Claims, 5 Drawing Sheets

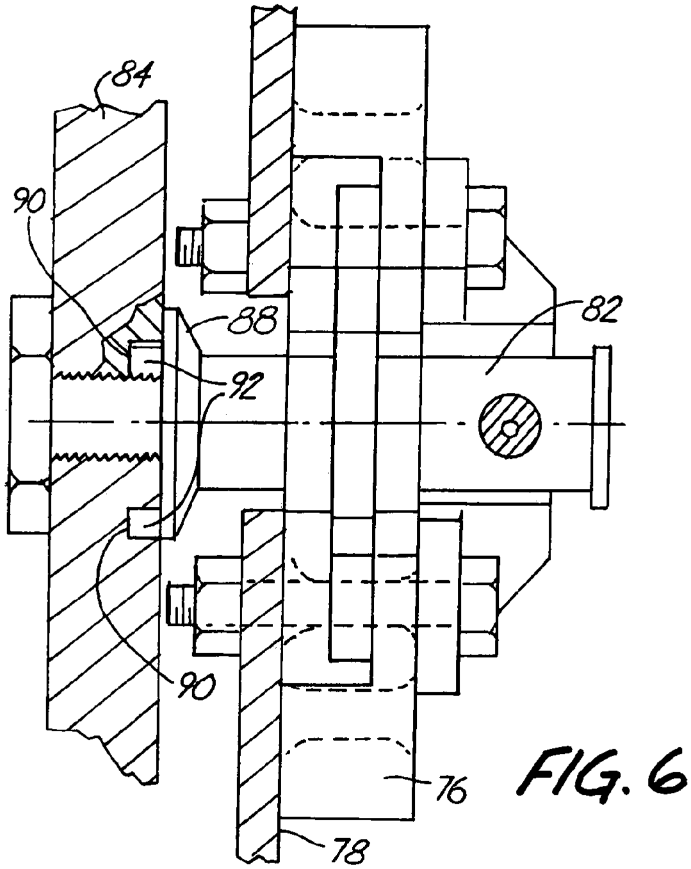
FIG. 6
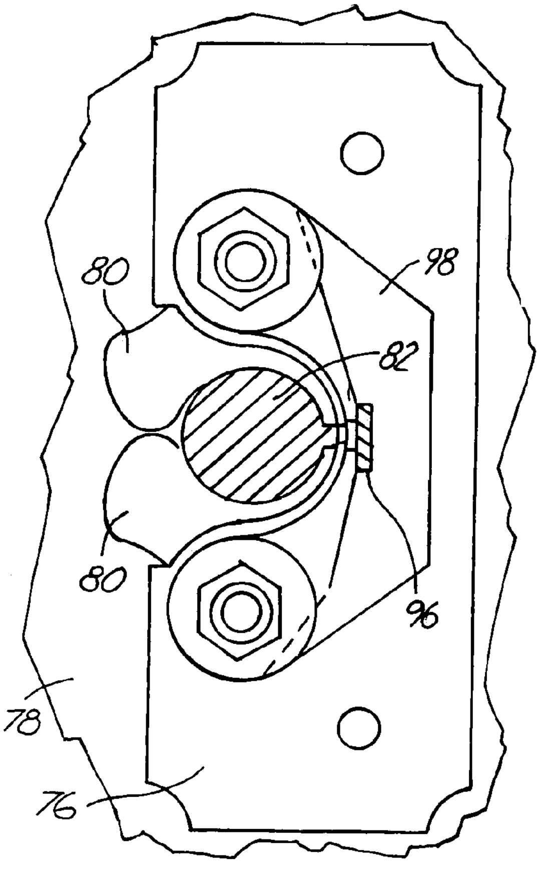
FIG. 7
FIG. 8
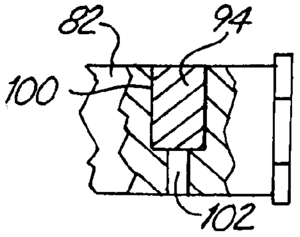

SENSOR AND INTERLOCK ON AN INDUSTRIAL VEHICLE

BACKGROUND OF THE INVENTION

The present invention relates to an interlock system for determining whether a door or cover is closed and latched. When a door on a cab on an industrial vehicle, such as a skid steer loader, is unlatched, a lock out signal to disable components of the vehicle is provided until such time as the cab door is again closed and latched.

Skid steer loaders are operated with rollover protection cabs, and in inclement weather, either hot or cold, the cab can be enclosed, and a door provided on the operator entrance opening. It has been found that because of the compact nature of skid steer loader, in particular, if the door is fully opened and the lift arms of the loader are operated, the door can become damaged by the lift arms.

SUMMARY OF THE INVENTION

The present invention relates to a sensor for determining when a latch on a door or other hinged cover is closed and latched to provide a signal indicating the door or cover is properly latched closed. The signal is used, as disclosed, as a signal to an interlock system, and when the latch is not properly secured with the door closed, that is, when the door is ajar or open, controls for operation of some secondary system, such as the lift arm and bucket tilt cylinder of a loader, are disabled.

A switch used for determining when the door is closed and latched can be a magnetic reed switch or a Hall effect sensor, with a magnet mounted on a latch striker or bolt secured to the frame of the cab. The sensor is positioned on the door so that unless the door latch is adjacent to and in alignment with the magnet on the striker bolt, that is, fully seated or secured, there will be no enabling signal to permit operation of the selected system, for example, the lift and tilt cylinders of the loader, that are used for operation of the lift arms.

The skid steer loaders that are made by Bobcat Company, a business unit of Ingersoll-Rand Company presently include a interlock control system that prevents operation of the vehicle in response to selected sensor inputs indicating a selected condition. The sensor of the present invention is designed to provide an input to such a system so that when the door is in place on the cab, an additional signal from the latch sensor is needed to enable the operation of the lift arms and bucket cylinders of the skid steer loader. The same arrangement can be used for locking our functions on other vehicles or systems that have a door or cover that should be closed and latched before the selected functions are enabled.

The present door shown will provide an input to similar interlock systems where a controller is disabled when the sensor signal indicates that a door or cover is not closed and latched.

BRIEF DESCRIPTION OF THE DRAWINGS

FIG. 6 is a schematic rear view of a latch having a modified sensor, showing the latch and a sensor from an interior of the cab;

FIG. 7 is a side sectional view of FIG. 6; and

FIG. 8 is a fragmentary detailed view of a latch striker of FIG. 6, with parts broken away.

DETAILED DESCRIPTION OF THE PREFERRED EMBODIMENTS

Figure 1:
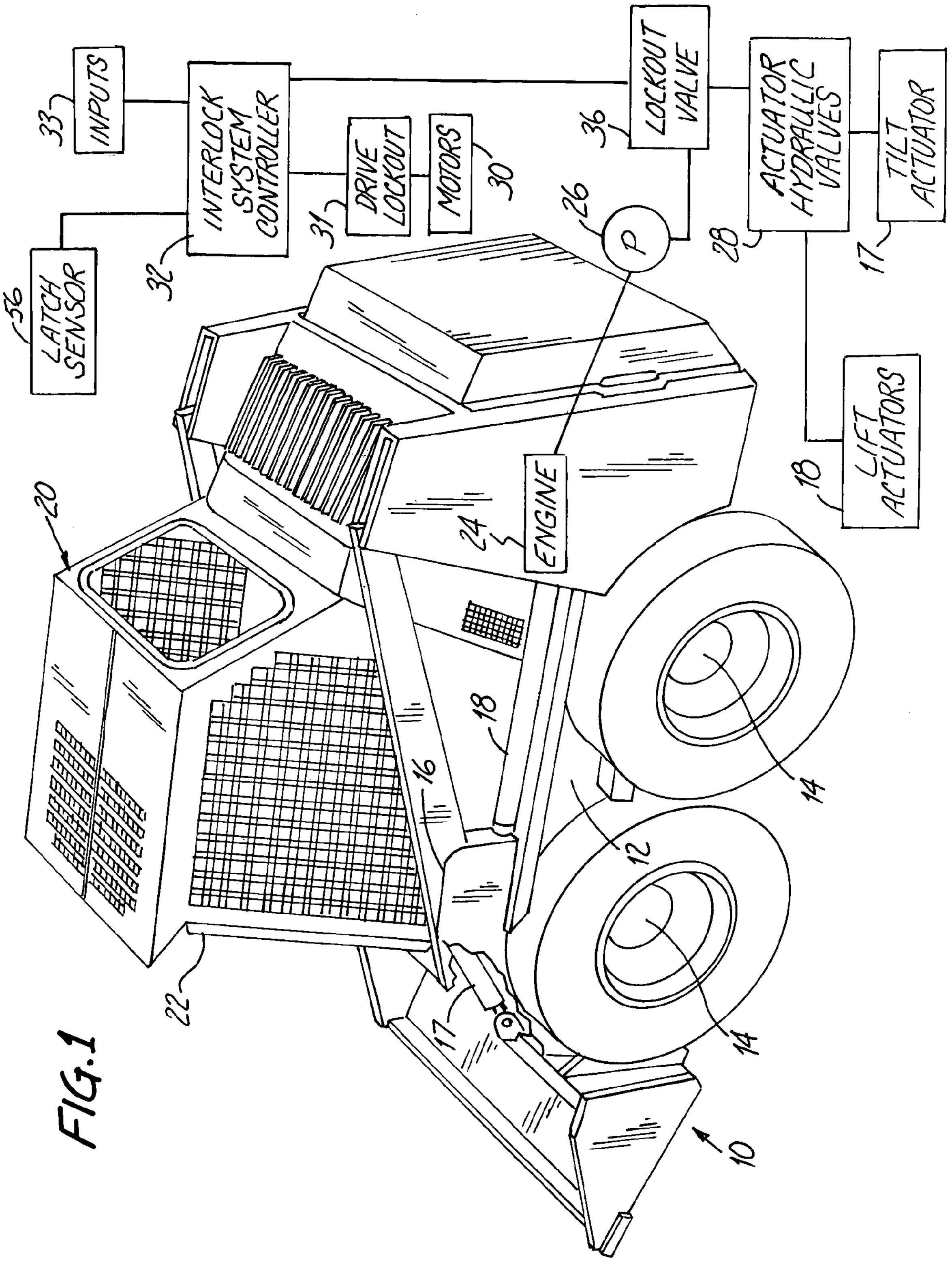
FIG. 1 is a schematic perspective view of a skid steer loader having an interlock system made according to the present invention.
Figure 2:
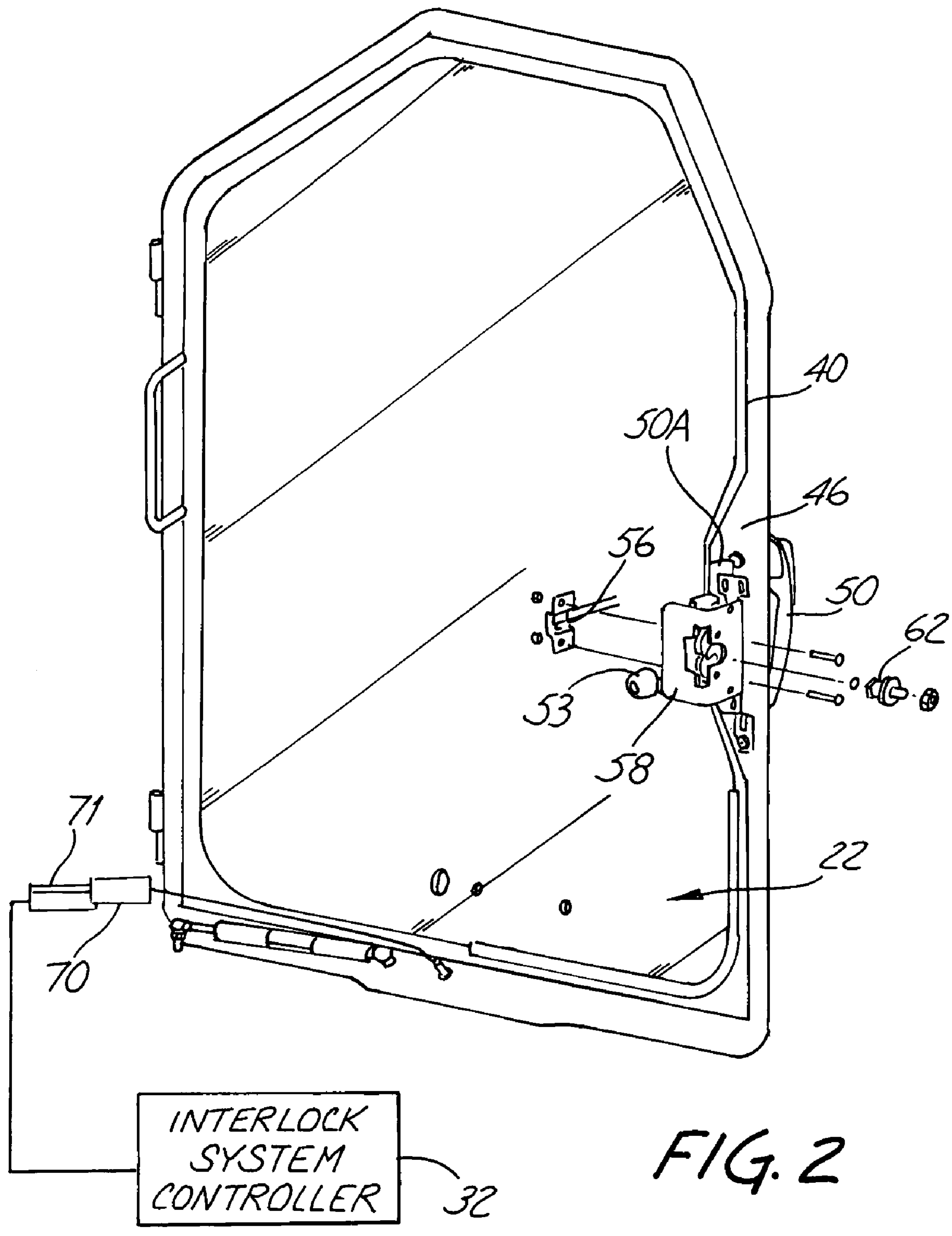
FIG. 2 is a fragmentary perspective view of a typical door and latch arrangement.
Figure 3:
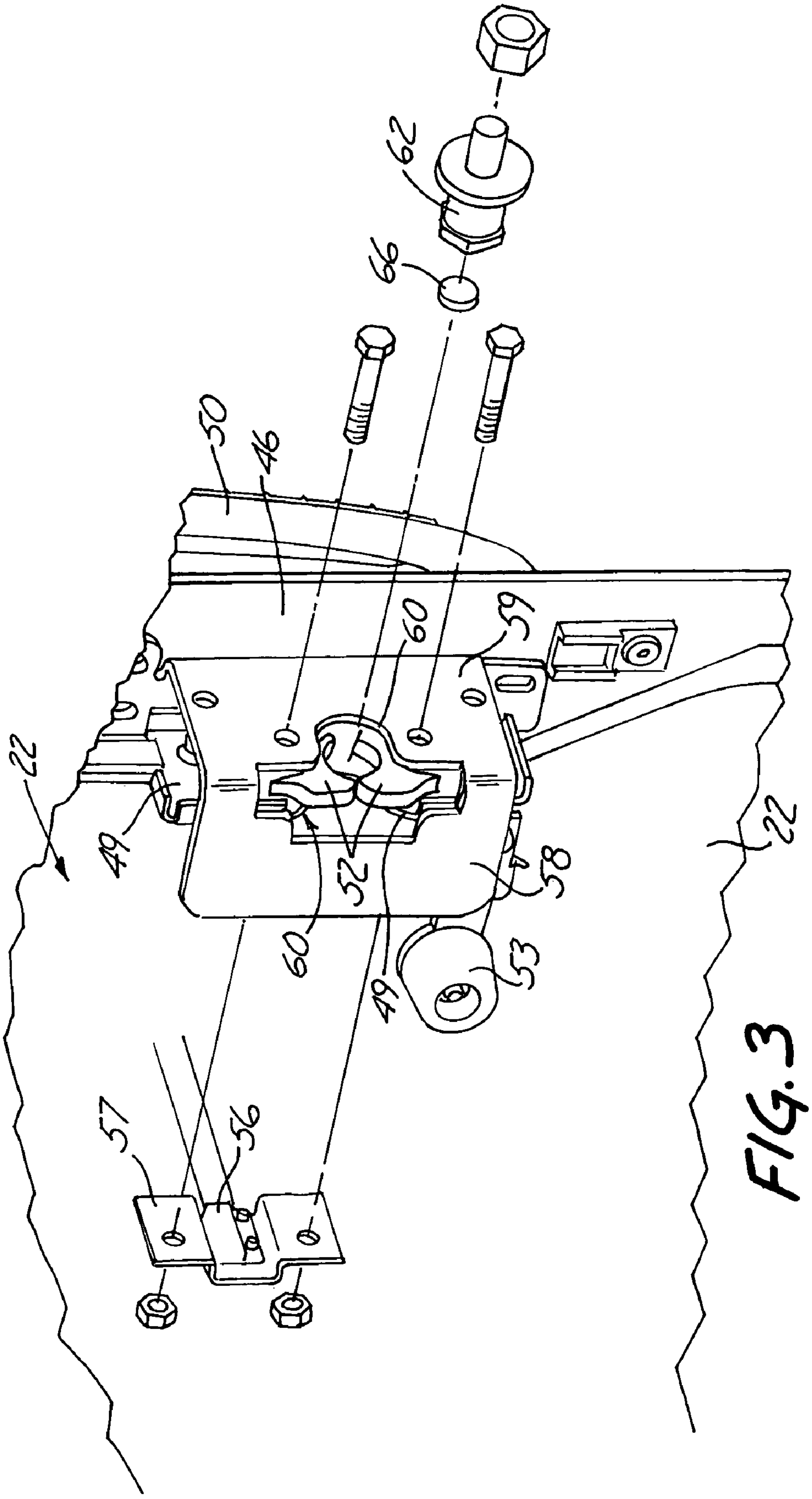
FIG. 3 is an enlarged, exploded rear perspective view of a door frame and latch assembly as viewed from the interior of the cab.
Figure 4:
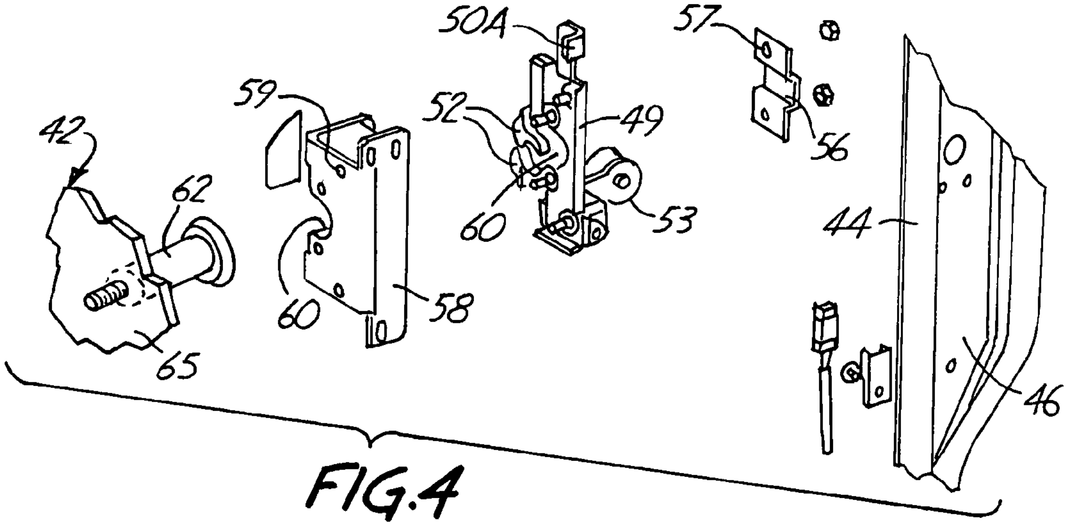
FIG. 4 is an enlarged exploded perspective view showing a typical latch assembly from an exterior of a cab door having a sensor system of the present invention installed.

A skid steer loader 10 is shown in FIG. 1, and it has a frame 12, supported on wheels 14, and further it has a pair of pivoting lift arms 16 that are operated with hydraulic actuators 18. The lift arms support a tilting bucket 15 that is raised with the lift arms and tilted using a tilt hydraulic cylinder or actuator 17. The skid steer loader has a cab 20, as shown, and in this instance, a door assembly 22 (see FIG. 2) is provided on the cab. The door can hinge between an open and closed position. An engine 24 is used for providing power to a hydraulic system including a hydraulic pump 26 connected to a lockout valve 36, and providing power to a set of actuator hydraulic valves 28 and then to the various hydraulic components such as the lift arm actuator 18 and bucket tilt actuator 17. Drive hydraulic motors 30 are used for driving the wheels 14 in a conventional manner.

A drive interlock system 32, is provided as is disclosed in U.S. Pat. No. 5,425,431 in greater detail. The specification of U.S. Pat. No. 5,425,431 is incorporated by reference. The interlock system 32 has logic controls that, among other functions, enables or disables the operation of actuator hydraulic valves 28, through a lockout valve 36 and it also can control operation of drive motors 30 (or other drive), through a drive lockout 31. Operation of the lift arm cylinders or actuators 18, and the tilt cylinders or actuators 17 is enabled only when lockout valve 36 is open.

In the present invention, whenever a door is installed on a cab, a circuit is closed by a normally closed switch or sensor 56 on the door latch, that will be more fully explained, unless the door is closed and a door latch is secured or latched. The closing and latching of the door assembly 22 relative to the cab frame around the door opening on the cab 20 provides a signal to the interlock system 32 by opening the switch or sensor 56 so the lockout valve 36 is enabled or open and the actuator valves 28 receive hydraulic fluid under pressure. The valves 28 can then be operated to provide hydraulic fluid to the cylinders 18, and 17.

If desired, the door latch switch or sensor can be used to control other functions of a vehicle, such as operating the drive lockout 31 to prevent the vehicle or loader from moving until the door is closed and latched. Interlock valve 36 must be open in order for hydraulic fluid under pressure to be provided to the hydraulic valves 28. When interlock valve is closed or disabled it completely shuts off the operation of the selected components or functions of the machine including hydraulic cylinders. The lift actuators 18 and tilt actuator 17 are disabled until the door is closed and latched. Other inputs 33, as disclosed in U.S. Pat. No. 5,425,431, also may be needed to enable valve 36 and drive lockout 31.

The door 32 is hinged as at 40, along one side relative to the cab, and is positioned in a door opening frame shown at 42. The door assembly 22 is generally made with an exterior peripheral frame in which a transparent panel is supported a shown in U.S. Design Pat. No. D437,275. The door has a handle panel portion 44 that includes a latch assembly plate 46.

The latch assembly plate 46 supports a conventional door latch assembly 48, that is operated from a push button handle 50, also of conventional design. The push button on the handle engages a lever 50A on the interior of the door that operates cams to open the door. An operator handle 53 in the cab 20 permits the operator to open the door. The handle 50 is securely clamped onto the latch plate 46.

Movement of the push button on handle 50 operates against lever 50A so cams move in a conventional manner and open or separate a pair of spring loaded latch dogs 52, that are pivotally mounted between a plate 49 as supported in a latch housing 58, and an outer wall 59 of the latch housing 58. The details of the latch operator are not shown, but the push buttons and lever operate to open or separate the latch dogs 52, which are spring loaded to a closed position.

The latch housing 58 is used to also support a normally closed latch sensor or switch 56 that is mounted on a bracket 57 which is attached to an inner side of plate 49. The closed switch 56 closes a circuit and provides a signal to the interlock system controller 32 to close lockout valve 36 whenever a door is installed. The latch housing wall 59 and plate 49 have U-shaped openings or notches 60 that are open on the interior side of the latch and that will receive a latch striker bar 62 that is mounted onto the door opening frame wall 65 on the cab. An end 63 of the latch striker bar 62, extends through an opening in wall 65, forming part of the door opening frame on the cab and is held fixed on the wall 65 with a nut in a normal manner.

The latch striker bar 62 is a cylindrical shaft. The latch dogs 52 will cam on the latch striker bar and the spring load on the latch dogs permits them to separate to fit over the striker bar 62 and latch in place when the door is fully closed.

Figure 5:
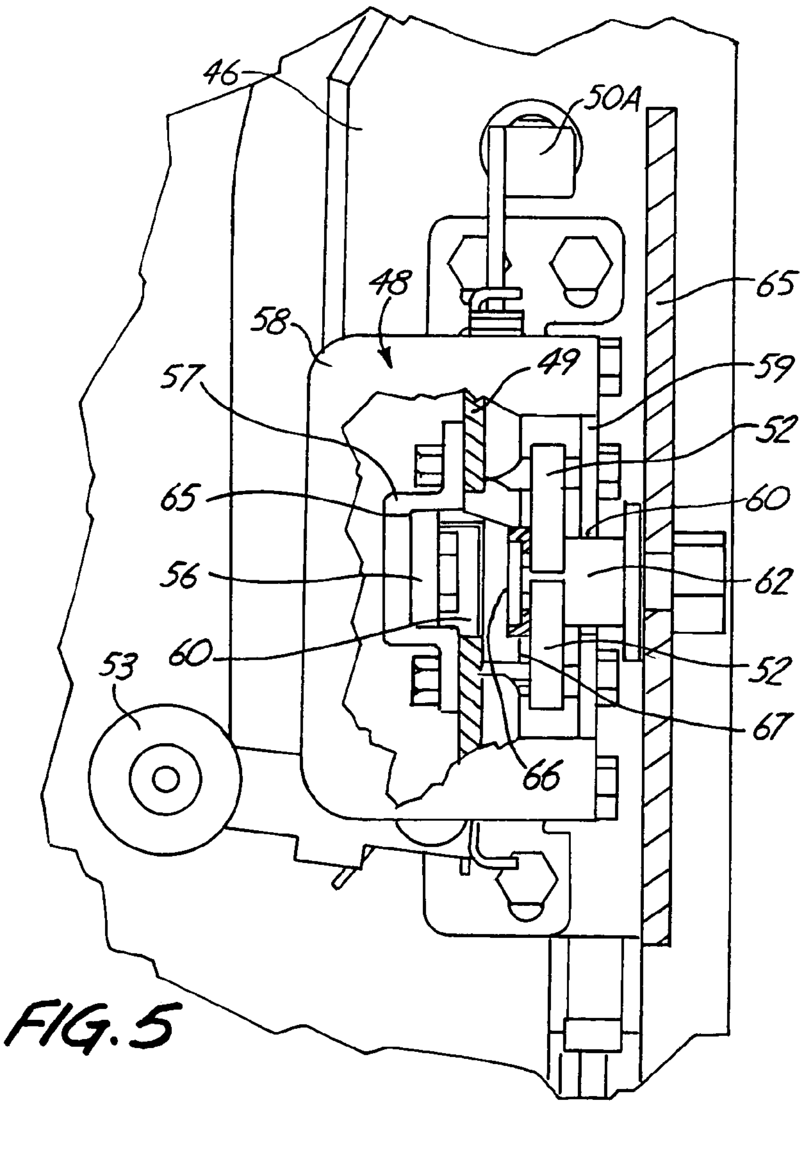
FIG. 5 is a rear view of the latch from the interior of the cab showing the striker and the door latch in a latched position with parts broken away.

The latch striker carries a permanent, preferably high strength, magnet 66 on a head end 67 of the striker bar. The magnet 66 is suitably positioned to be aligned with an adjacent sensor or switch 56 only when the door is in closed and latched position. The notches 60 in wall 49 are open so the magnetic field from magnet 66 affects notch or sensor 56 when the door is closed and latched. The magnet 66 is held in a recess in the head end 67 of the striker bar 62, which can be seen in FIG. 5 where the head end 67 of the striker bar 62 has been broken away. When the door is closed and latched, the normally closed sensor or switch 56 will be shifted in state or position to open due to the presence of the magnetic field from the magnet 66.

The sensor 56 can be a magnetic reed switch, or can be a Hall effect sensor with the actuating magnet 66 carried in the striker bolt or bar 62.

The sensor leads are extended along the door frame 40 that is used for supporting the glass in the door, and the leads are connected with a coupler 70 on the door that connects to a connector 71 on the frame 12 of the loader that leads to the controller 32.

In many instances, an industrial vehicle will be operated without a door, and thus, the present arrangement is designed to permit operation of the loader lift and tilt cylinders when a door is not used. The wiring on the loader body can remain in place and the lift and tilt cylinders will be operable.

When a door is not originally present or is taken off, the coupler 70 is separated from connector 71 and the circuit to the interlock controller is open. The normally closed switch or sensor 56 is removed with the door. With the circuit open, there is no signal from the door circuit that causes the controller 32 to close the interlock valve 36.

The switch or sensor 56 is normally closed as stated, and when the door is installed, the coupler 70 is connected to connector 71 on the frame 12. The switch 56 is closed and the controller 32 causes the valve 36 to move to position to block operation of the loader lift and tilt actuators. When the door is removed and the coupler 70 and connector 71 separate, the sensor or switch 56 is no longer in the circuit so the circuit is open and the interlock valve 36 is not closed by the door latch circuit.

When the door 23 is in place, the door 22 preferably has to be closed and latched so that the sensor component 56 on the door is operated (opened) by the component on the striker or on a fixed portion on the cab, such as a door frame to “enable” the interlock valve 36.

It also should be noted that the latch can be on the cab, and a fixed striker positioned on the door. When desired, the sensor arrangement can be selected to sense a door closed, but not fully latched position. The door position could be one where it was known that the door was not going to interfere with, or be in the way of, the lift arm movement.

FIGS. 9 and 10 show a modified form of the invention schematically. A latch plate 76 that mounts onto a door 78 is shown in latched position, with latch dogs 80. A striker cylinder or bar 82 is held in the latch dogs. The striker bar is mounted onto a fixed cab frame wall 84.

In this form of the invention, the striker bar 82 has a flange 88 that carries locating pins 90 that are not symmetrical about the axis of the striker bar, and which will fit in provided receptacles 92 in the cab frame wall to make sure that the positioning of the magnet 94 is correct for alignment with a Hall effect sensor 96 that is supported on the latch housing 98.

The magnet 94, as shown in FIG. 9, is inserted into a cross hole or bore 100 in the striker bar. Hole 100 is of size to receive the magnet 94. A smaller diameter cross bore 102 is provided in alignment with the bore 100, so that the magnet can be either pushed out or pounded out of hole 100 for replacement.

The Hall effect sensor 96 is connected to the interlock system 32 so that when the door is on the loader but is not closed sufficiently the lift and tilt actuators and other selected power components are disabled, as previously explained. Variations in sensors thus can be made, and variations in magnet mounting also can be provided.

The strength of the magnet field, and the sensitivity of the sensor can be selected so that mounting one or both of the sensor components adjacent the latch and/or striker will provide a door position signal that will enable the lift arms when the door will not be in the path of the lift arms.

In automotive applications, a door striker for a door latch is used and the same sensor system can be utilized. Some door latches operate so that if tripped but not fully latched, the door latches have to be reset by operating the door latch before the door can be fully closed and latched. The sensor system of the present invention is preferably sensitive to the fully closed and latched position of the door and will not permit operation of the controlled function until both door closing and latching occurs. However, as pointed out, in some applications a signal indicating the door is in a closed or newly closed position is satisfactory.

Although the present invention has been described with reference to preferred embodiments, workers skilled in the art will recognize that changes may be made in form and detail without departing from the spirit and scope of the invention.

What is claimed is:

1. A loader having a frame, a drive to move the frame, a lift arm on the frame, a lift actuator for raising and lowering an outer end of the lift arm, a cab structure on the frame, an operator door for permitting entrance and egress from the cab, said door being hingedly mounted on the cab, a door latch, and a latch striker for the latch, said latch engaging the latch striker to hold the door closed, wherein the improvement comprises a two component sensor arrangement between the door and a portion of the cab adjacent the door opening positioned to sense whether the latch is in engagement with the latch striker to hold the door closed, wherein the latch striker comprises the portion of the cab, and a lockout for enabling and disabling operating functions, said sensor arrangement being connected to the lockout to disable the functions when the sensor arrangement indicates the door is not held closed, wherein the sensor arrangement comprises a switch carried on the door latch, and a switch actuator carried on the striker, said switch being a normally closed switch connected in a circuit for the lockout, the switch being opened when the door is closed and the latch is engaging the striker, a circuit connector from the switch to the lockout, the lockout being carried on the loader frame, the connector being separable to leave the circuit open when the door is removed from the loader frame and the circuit, the lockout being operable to enable the operating functions when the circuit is open.

2. The loader of claim 1, wherein said lockout comprises a lockout valve for hydraulic functions.

3. The loader of claim 1, wherein said lockout comprises a lockout valve that is normally open, and a controller for the lockout valve to receive the signals from the sensor arrangement.

4. An interlock arrangement for controlling operation of power components on a powered vehicle, said vehicle having an operator access opening, and a removable door for closing the access opening, the door having a closed position wherein the door is positioned out of a zone of movement of power components, a latch having first and second latch components, the first latch component being mounted on the door, and the second latch component being mounted on the vehicle, the first and second latch components mating to hold the door in its closed and latched position, a sensor having a first sensor element mounted adjacent the first latch component, and a second sensor element mounted adjacent the second latch component, an interlock controller with a sensor input configured to receive a signal from the sensor indicative of the position of the door, the interlock controller being configured to provide an output to enable operation of at least one power component when the door is in the closed position and wherein the interlock controller is configured to enable the at least one power component when the door and the first sensor element are removed from the vehicle.

5. The interlock system of claim 4, wherein the first sensor element comprises a switch, and the second sensor element comprises a switch actuator.

6. The interlock system of claim 5, wherein the first sensor element is a magnetic field sensitive switch, and the second sensor element is a magnetic field producing element.

7. The interlock system of claim 6, wherein said magnetic field sensitive element is mounted on the door latch, and the magnetic field producing element is mounted on the vehicle.

8. The interlock system of claim 6, wherein said second latch component on the vehicle comprises a latch striker.

9. The interlock system of claim 8, wherein said first sensor element is a magnetic field sensitive switch and the second sensor element is mounted on the striker and is a permanent magnet.

* * * * *